United States Patent [19]

Matsuda et al.

[11] 4,350,854
[45] Sep. 21, 1982

[54] PRESSURE-SENSITIVE SWITCH UNIT IN RESONATOR ASSEMBLY OF TIRE PRESSURE DROP DETECTING APPARATUS

[75] Inventors: Akira Matsuda, Higashi Murayama; Yoshihiro Havakawa, Akigawa; Shigeo Yasuda, Musashino; Motoaki Iwasaki, Musashino; Hiroshi Nishino, Musashino, all of Japan

[73] Assignees: Bridgestone Tire Company Limited; Mitaka Instrument Company Limited, both of Tokyo, Japan

[21] Appl. No.: 163,476

[22] Filed: Jun. 27, 1980

[30] Foreign Application Priority Data

Jul. 3, 1979 [JP] Japan ............................ 54/91628[U]

[51] Int. Cl.³ ............................................... H01H 35/24
[52] U.S. Cl. .................................. 200/61.25; 200/83 P
[58] Field of Search ............... 200/61.22, 61.25, 83 R, 200/83 N, 83 P, 83 Q, 302

[56] References Cited

U.S. PATENT DOCUMENTS

| | | | |
|---|---|---|---|
| 4,006,327 | 2/1977 | Hayashi et al. | 200/61.25 |
| 4,071,724 | 1/1978 | LeJeune | 200/61.25 |
| 4,254,312 | 3/1981 | Migrin et al. | 200/61.25 |
| 4,255,628 | 3/1981 | Broetto | 200/61.25 |

FOREIGN PATENT DOCUMENTS 52-30553 7/1977 Japan .

Primary Examiner—James R. Scott
Attorney, Agent, or Firm—Cushman, Darby & Cushman

[57] ABSTRACT

A pressure-sensitive switch unit forming part of a resonator assembly for use in a tire pressure drop detecting apparatus of the electromagnetic induction type, wherein an atmospheric chamber, formed in a casing structure and hermetically isolated by a diaphragm from a pressure-acting chamber communicating with the tire chamber in a tire-and-wheel assembly, communicates with the atmosphere through contact surfaces of two or three of the component parts of the casing structure and further through a body of a gas-permeable synthetic rubber in part exposed to the atmosphere so that an atmospheric pressure is at all times introduced into the atmosphere atmospheric chamber and an ingress of water and dust into the atmospheric chamber is precluded by the body of the gas-permeable synthetic rubber.

18 Claims, 6 Drawing Figures

4,350,854

PRESSURE-SENSITIVE SWITCH UNIT IN RESONATOR ASSEMBLY OF TIRE PRESSURE DROP DETECTING APPARATUS

FIELD OF THE INVENTION

The present invention relates to a tire-and-wheel assembly of a vehicle and, particularly, to an apparatus for detecting a pressure drop in a tire chamber of a tire-and-wheel assembly including a wheel rim rotatable about the axis of rotation of an axle of an automotive vehicle and a tubeless pneumatic tire fitted to the wheel rim. More particularly, the present invention relates to a pressure-sensitive switch unit which forms part of a resonator assembly for use in a tire pressure drop detecting apparatus of the electromagnetic induction type which uses an electric oscillator assembly held stationary with respect to the body structure of a vehicle and an electric resonator assembly mounted on a tire-and-wheel assembly of the vehicle.

BACKGROUND OF THE INVENTION

In a tire pressure drop detecting apparatus of the electromagnetic induction type, the resonator assembly mounted on a tire-and-wheel assembly or, particularly, the wheel rim forming part of the tire-and-wheel assembly comprises a pressure-sensitive switch unit which is arranged to be responsive to the pressure of the compressed air in the tire chamber and which is electrically connected between a resonant inductor and a resonant capacitor. The resonance circuit thus constituted by the resonant inductor and capacitor electrically connected together across the pressure-sensitive switch unit is responsive to the electromagnetic wave radiant from the oscillator assembly when the tire-and-wheel assembly rotating about the center axis of the wheel rim assumes a predetermined angular position with respect to the oscillator assembly which is held stationary with respect to the vehicle body structure. In response to the electromagnetic wave emitted from the oscillator assembly, an electric current is induced in the resonance circuit if the pressure-sensitive switch unit intervening between the resonant inductor and capacitor constituting the resonance circuit is closed. The pressure-sensitive switch unit is adapted to be closed in response to an air pressure higher than a predetermined acceptable value and to be open in response to an air pressure lower than the predetermined acceptable value. When the pressure of air in the tire-and-wheel assembly carrying the resonator assembly is higher than the predetermined acceptable value, a current is produced in the resonator assembly each time the tire-and-wheel assembly makes a full turn about the center axis of the wheel rim during cruising of the vehicle. The induction of a current in the resonator assembly results in a normal decrement in the energy of the electromagnetic wave radiant from the oscillator assembly, which thus produces a signal representative of such a normal decrement. The signal produced by the oscillator assembly is delivered to a signal processing unit connected to suitable output means such as a display or warning device and holds the display or warning device inoperative. In the event the pressure of the air in the tire chamber drops unusually due to, for example, a puncture of the tire, the pressure-sensitive switch unit incorporated in the resonator assembly is made open so that the resonant inductor and capacitor of the resonator assembly are electrically disconnected from each other and are disabled from producing a current in response to the electromagnetic wave radiant from the oscillator assembly. As a consequence, the oscillator assembly produces a signal indicative of the elimination of a normal decrement in the energy of the electromagnetic wave from the oscillator assembly and causes the signal processing unit to actuate the display or warning device to produce a sound or luminant signal.

In a prior-art resonator assembly for use in a tire pressure drop detecting apparatus of the electromagnetic induction type such as, for example, the resonator assembly taught in Japanese Utility Model Publication No. 52-30553, the pressure-sensitive switch unit has a pressure-acting chamber communicating with the tire chamber in a tire-and-wheel assembly and a reference-pressure chamber hermetically isolated from the pressure-acting chamber by means of a flexible diaphragm of rubber or metal and having established therein a predetermined air pressure lower than a normal pressure of air in the tire chamber of a tire-and-wheel assembly. The flexible diaphragm intervening between the pressure-acting and reference-pressure chambers is biased to be deformed in a direction to contract and expand the pressure-acting and reference-pressure chambers, respectively, by, for example, the elasticity of the diaphragm per se. When the pressure of air developed in the pressure-acting chamber is higher than a predetermined value, the diaphragm is forced to be deformed in the opposite direction against the biasing force and the force constantly exerted on the diaphragm by the pressure of the air confined in the reference-pressure chamber. In the event a puncture takes place in the tire forming part of the tire-and-wheel assembly arranged with such a pressure-sensitive switch unit, there is caused a sudden drop in the pressure of air in the pressure-acting chamber of the switch unit so that the diaphragm of the switch unit is allowed to be deformed in the direction in which the diaphragm is biased to be deformed. Such deformation of the diaphragm is converted into or used as a switching action to cause the switch unit to open.

The prior-art resonator assembly incorporating the pressure-sensitive switch unit of the above described nature is mounted in its entirety on the wheel rim of the tire-and-wheel assembly and is, when in use, subjected to temperatures of a range which is as broad as to span from approximately minus 40° C. to approximately 120° C. If, therefore, the switch unit is enclosed in an airtight casing structure which is hermetically sealed from the atmosphere, the pressure of the air confined in the reference-pressure chamber of the switch unit is subject to change with the change in the temperature transferred to the switch unit. The reference pressure for the switch unit being thus variable with temperature, the switch unit can not be accurately responsive to a predetermined value of the air pressure in the tire chamber.

If, furthermore, the casing structure of the pressure-sensitive switch unit of the prior-art resonator assembly is sealed from the atmosphere by the use of an organic adhesive compound applied to the contact surfaces of the component parts of the casing structure, the adhesive compound tends to generate gas therefrom when the casing structure is subjected to high temperatures. The gas thus generated from the adhesive compound is allowed into the reference-pressure chamber of the switch unit and adds to the pressure of air in the reference-pressure chamber, giving rise to an increase in the reference pressure for the switch unit.

The pressure-acting and reference-pressure chambers of the switch unit are hermetically isolated from each other by the flexible diaphragm intervening therebetween. During use of the resonator assembly, however, the pressure of air introduced into the pressure-acting chamber from the tire chamber of the tire-and-wheel assembly is inevitably allowed to leak into the reference-pressure chamber. If the casing structure of the switch unit is perfectly sealed from the atmosphere, the leak of the compressed air into the reference-pressure chamber is accumulated in a long run and also gives rise to an increase in the reference pressure for the switch unit.

The present invention contemplates elimination of the drawbacks which have thus been inherent in a prior-art pressure-sensitive switch unit of the described character.

It is, accordingly, an important object of the present invention to provide an improved pressure-sensitive switch unit in which the pressure of air in the reference-pressure chamber is at all times maintained at a constant value without respect to change in the temperature transferred to or surrounding the switch unit.

It is another important object of the present invention to provide an improved pressure-sensitive switch unit which is durable and reliable in operation when incorporated into a resonator assembly for use in an apparatus for detecting a pressure drop in a tire-and-wheel assembly.

It is still another important object of the present invention to provide a resonator assembly including the improved pressure-sensitive switch unit.

Yet, it is still another important object of the present invention to provide a tire pressure drop detecting apparatus including such a resonator assembly.

SUMMARY OF THE INVENTION

In accordance with the present invention, there is provided a pressure-sensitive switch unit to form part of a resonator assembly for use in an apparatus for detecting a pressure drop in a tire chamber of a tire-and-wheel assembly which consists essentially of a wheel rim and a pneumatic tire fitted to the wheel rim and which has the tire chamber formed between the tire and the wheel rim, the switch unit comprising a casing structure at least in part encapsulated in a body of a dielectric potting compound, a connecting member fitted to the casing structure and formed with a passageway for communication with the tire chamber in the tire-and-wheel assembly, a resilient diaphragm positioned between the casing structure and the connecting member and forming a variable-volume pressure-acting chamber between the diaphragm and the connecting member and a variable-volume atmospheric chamber between the diaphragm and the casing structure, the pressure-acting chamber being open to the passageway in the connecting member, the casing structure and the connecting member having respective surface portions which are held in contact with each other and which have formed therebetween an interstice which is open at one end to the atmosphere and which communicates at the other end with the atmospheric chamber, and a body of gas-permeable synthetic rubber which is applied to the above mentioned surface portions adjacent the above mentioned one end of the interstice and which is in part exposed to the atmosphere for providing air communication between the atmosphere and the interstice through the aforesaid body of the gas-permeable synthetic rubber.

The casing structure and the connecting member of the pressure-sensitive switch unit thus constructed and arranged basically may respectively have peripheral surface portions which are radially spaced apart from each other and which have an annular gap formed therebetween, the gas-permeable synthetic rubber being applied in the form of an annular layer in this gap throughout the circumference of the gap. In this instance, the casing structure may have a portion projecting outwardly from the body of the dielectric potting compound with the connecting member fitted to the particular portion of the casing structure. Furthermore, the casing structure may be embedded in its entirety in the body of the dielectric potting compound. In this instance, the connecting member has a portion embedded in the body of the dielectric potting compound, the above mentioned portion of the connecting member having a surface adjacent the aforesaid peripheral surface portions of the casing structure and the connecting member, the gas-permeable synthetic rubber being further applied in the form of a layer onto the above mentioned surface of the aforesaid portion of the connecting member and being partialy exposed to the atmospheric air.

When the casing structure and the connecting member of the switch unit respectively have peripheral surface portions which are radially spaced apart from each other and which have an annular gap formed therebetween as above mentioned, the body of the gas-permeable synthetic rubber may be constituted by an annular sealing element of the synthetic rubber and closely fitted in the above mentioned gap. In this instance, the casing structure may also have a portion projecting outwardly from the body of the dielectric potting compound with the connecting member fitted to the aforesaid portion of the casing structure.

BRIEF DESCRIPTION OF THE DRAWINGS

The features and advantages of a pressure-sensitive switch unit according to the present invention will be more clearly and accurately appreciated from the following description taken in conjunction with the accompanying drawings in which like reference numerals designate similar or corresponding members, elements and structures and in which.

DESCRIPTION OF THE PREFERRED EMBODIMENT

Description will be hereinafter made regarding the first preferred embodiment of the present invention with reference to FIGS. 1 to 3 of the drawings.

Figure 1:
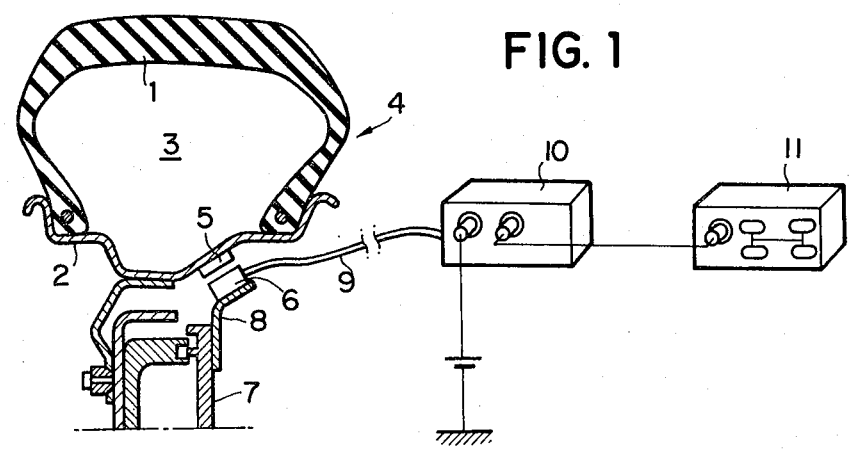
FIG. 1 is a sectional view showing partly in perspective the arrangement in which a resonator assembly incorporating therein a pressure-sensitive switch unit according to the present invention is installed on a tire-and-wheel assembly for use in an automotive vehicle.

Referring first to FIG. 1 of the drawings, a tubeless pneumatic tire partially shown in cross section at 1 has its annular bead portions securely but detachably fitted to the respective outer faces of inner and outer flange portions of a wheel rim 2. The wheel rim 2 is welded or otherwise securely attached to a wheel disc bolted or otherwise securely connected to the hub of a road wheel as is well known in the art and has a center axis coincident with the axis of rotation of the road wheel.

The tire 1 and the wheel rim 2 have formed therebetween a tire chamber 3 filled with air under pressure, the tire and rim constituting in combination with each other a tire-and-wheel assembly 4. The wheel rim 2 has an annular well portion circumferentially extending between and along the inner and outer flange portions of the rim 2 and defining the radially inner end of the tire chamber 3. The well portion of the wheel rim 2 is in part inclined with respect to the center axis of the rim 2. The brake mechanism for the road wheel is herein assumed to be of the drum type by way of example and is thus shown as including a brake drum bolted to the wheel hub. It will however be apparent that the tire-and-wheel assembly 4 illustrated in FIG. 1 may form part of a vehicle road wheel using a disc-type wheel brake mechanism (not shown).

To the inclined outer face of the well portion of the wheel rim 2 is attached an electric resonator assembly 5 which is arranged to be operable for coacting with an electric oscillator assembly 6 mounted on a backing plate 7 by means of a bracket 8. The backing plate 7 is secured to the steering knuckle or the axle housing (not shown) and is accordingly held stationary with respect to the body structure of a vehicle. The resonator assembly 5 and the oscillator assembly 6 are arranged to be aligned with or located in face-to-face relationship to each other when the tire-and-wheel assembly 4 assumes, about the center axis of the wheel rim 2, a predetermined angular position with respect to the backing plate 7 which is held stationary with respect to the vehicle body structure.

As shown schematically in FIG. 1, the oscillator assembly 6 is electrically connected by a coaxial cable 9 to a signal processing unit 10 adapted to detect from the signals delivered from the oscillator assembly 6 an unusual drop in the pressure of the compressed air in the tire chamber 3 when such a pressure drop takes place as a result of, for example, a puncture of the tire 1. The signal processing unit 10 in turn is electrically connected to suitable output means such as, for example, a display or warning device 11 positioned in the vicinity of the driver's seat of an automotive vehicle and adapted to produce a sound or luminant signal indicative of the occurrence of the puncture of the tire 1. The signal processing unit 10 and the display or warning device 11 to achieve these functions may be designed as desired by those skilled in the art and, for this reason, the detailed constructions and arrangements thereof are not herein described and shown.

Figure 2:
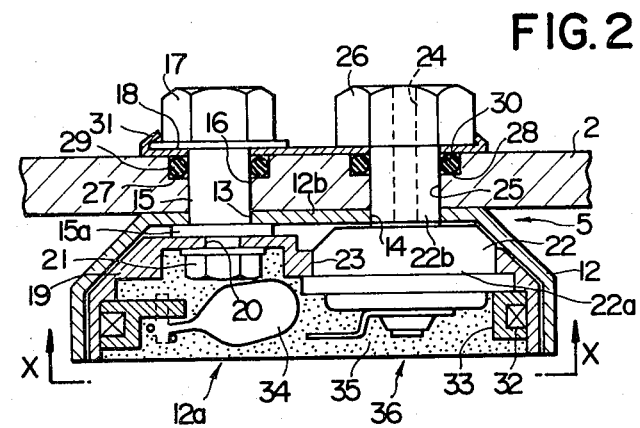
FIG. 2 is a cross sectional view showing the detailed construction of a resonator assembly incorporating therein a preferred embodiment of the pressure-sensitive switch unit according to the present invention.
Figure 3:
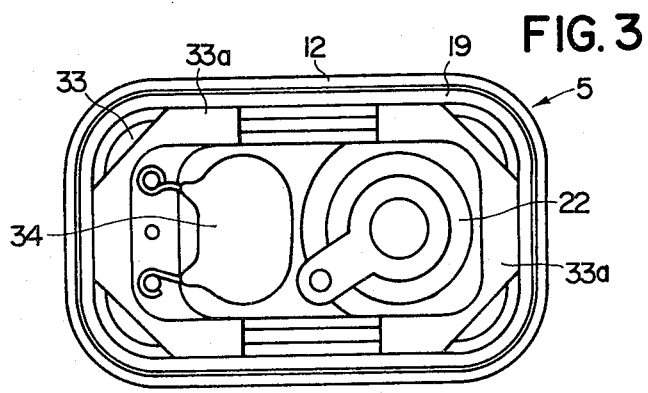
FIG. 3 is a plan view of the resonator assembly viewed in a direction indicated by arrowheads X in FIG. 2.

Turning to FIGS. 2 and 3 of the drawing, the resonator assembly 5 mounted on the well portion of the wheel rim 2 comprises, in accordance with the present invention, a generally trough-shaped protective outer receptacle 12 constructed of metal and having a largely rectangular cross section with curved or rounded corners as will be seen from FIG. 3. The protective outer receptacle 12 thus having two pairs of opposite and parallel side wall portions merging into one another through curved or rounded corner portions is open as at 12a (FIG. 2) so as to confront the stationary oscillator assembly 6 (FIG. 1) when the tire-and-wheel assembly 4 assumes about the center axis of the wheel rim 2 a predetermined angular position with respect to the backing plate 7 which is fastened on the vehicle body structure. The receptacle 12 has a substantially flat base wall portion 12b formed with two circular openings 13 and 14 which are spaced apart from each other in a direction in which the trough-shaped receptacle 12 is elongated. The protective outer receptacle 12 thus shaped is securely fastened to the outer face of the well portion of the wheel rim 2 by means of a bolt assembly which comprises a bolt 15 having threaded opposite end portions (not shown) and an annular flange portion 15a located adjacent one of the threaded end portions. The bolt 15 is closely passed through the opening 13 in the base wall portion 12b of the receptacle 12 and further through a circular opening 16 formed in the well portion of the wheel rim 2. The cross sections of the openings 13 and 16 are thus substantially similar in measurement to the cross section of an intermediate stem portion of the bolt 15. One of the threaded end portions of the bolt 15, viz., the threaded end portion remote from the flange portion 15a of the bolt 15 axially projects from the opening 16 in the well portion of the wheel rim 2 into the tire chamber 3 (FIG. 1) and is fastened to the inner face of the well portion of the wheel rim 2 by means of a nut 17 engaging the threaded end portion with a plain steel washer 18 interposed between the well portion of the wheel rim 2 and the inner end face of the nut 17 as shown. The other of the threaded end portions of the bolt 15, viz., the threaded end portion adjacent the flange portion 15a of the blot 15 axially projects from the opening 13 in the base wall portion of the protective outer receptacle 12 into the concavity in the receptacle 12 and has secured thereto a generally trough-shaped, concave inner receptacle 19 fixedly positioned within the protective outer receptacle 12 and constructed of a suitable rigid, electrically insulating material such as a rigid synthetic resin. The inner receptacle 19 has a side wall extending, when viewed in plan, in a generally rectangular closed-loop configuration which is substantially similar to the overall configuration of the side wall of the protective outer receptacle 12 and which is slightly smaller in measurement than the cross section of the concavity in the outer receptacle 12. Thus, the inner receptacle 19 has two pairs of opposite and parallel side wall portions merging into one another through curved or rounded corner portions and extending along the respectively corresponding side wall portions of the outer receptacle 12, as will be seen from FIG. 3. The inner receptacle 19 further has a base wall portion facing and substantially coextensive with the inner face of the base wall portion of the outer receptacle 12 and is formed with a circular opening 20 axially aligned with the opening 13 in the outer receptacle 12. The threaded end portion adjacent the flange portion 15a of the bolt 15 is passed through the opening 20 in the base wall portion of the inner receptacle 19 with the flange portion 15a closely fitted between the respective base wall portions of the outer and inner receptacles 12 and 19 and has the base wall portion of the inner receptacle 19 securely held thereto by means of a nut 21 engaging the threaded end portion adjacent the flange portion 15a. The inner receptacle 19 thus positioned fixedly within the concavity in the outer receptacle 12 has its base wall portion slightly spaced apart from the inner face of the base wall portion 12b of the outer receptacle 12 by the flange portion 15a of the bolt 15 and its four side wall portions slightly spaced apart inwardly from the respective inner faces of the four side wall portions of the outer receptacle 12 as will be seen from FIGS. 2 and 3. The opening 20 in the base wall portion of the inner receptacle 19 is shown to be smaller than the opening in the well portion of the wheel rim 2 and accordingly the threaded end portion adjacent the flange portion 15a of the bolt 15 is assumed to be smaller in diameter than the other threaded end portion of the bolt 15. This is merely by way of example and thus the diameters of the threaded end portions of the bolt 15 and the diameters of the openings 13 and 20 in the outer and inner receptacles 12 and 19 and the opening 16 in the well portion of the wheel rim 2 may be selected arbitrarily insofar as the outer and inner receptacles 12 and 19 can be properly held together and securely fitted to the well portion of the wheel rim 2 by means of the bolt 15 and the nuts 17 and 21.

The resonator assembly 5 further comprises a pressure-sensitive switch unit 22 which is operative to be closed in response to an air pressure higher than a predetermined value and to be open in response to an air pressure lower than the predetermined value. The switch unit 22 comprises a casing structure 22a closely received in an opening 23 formed in the base wall portion of the inner receptacle 19 and which axially projects in part into the concavity in the inner receptacle 19 and in part toward the inner face of the base wall portion 12b of the outer receptacle 12. In this instance, it is important that the casing structure 22a of the switch unit 22 be slightly spaced apart from the inner face of the base wall portion 12b of the receptacle 12 as will be seen from FIG. 2. The switch unit 22 further comprises passageway means constituted by a tubular connecting member 22b which is formed with an axial bore 24 open at the opposite ends of the connecting member 22b and which axially projects from the casing structure 22a into the tire chamber 3 through the opening 14 in the base wall portion 12b of the outer receptacle 12 and further through a circular opening 25 formed in the well portion of the wheel rim 2. The tubular connecting member 22b has a threaded leading end portion (not shown) engaged by a nut 26 securing the connecting member 22b to the well portion of the wheel rim 2. The nut 26 is thus effective to have the protective outer receptacle 12 secured to the well portion of the wheel rim 2 in cooperation with the bolt 15 and the nut 17 and to have the switch unit 22 secured to the well portion of the wheel rim 2. The respective cross sections of the opening 14 in the outer receptacle 12 and the opening 25 in the well portion of the wheel rim 2 have diameters substantially equal to the outside diameter of the tublar connecting member 22b, which is accordingly closely received in the openings 14 and 25.

Figure 4:
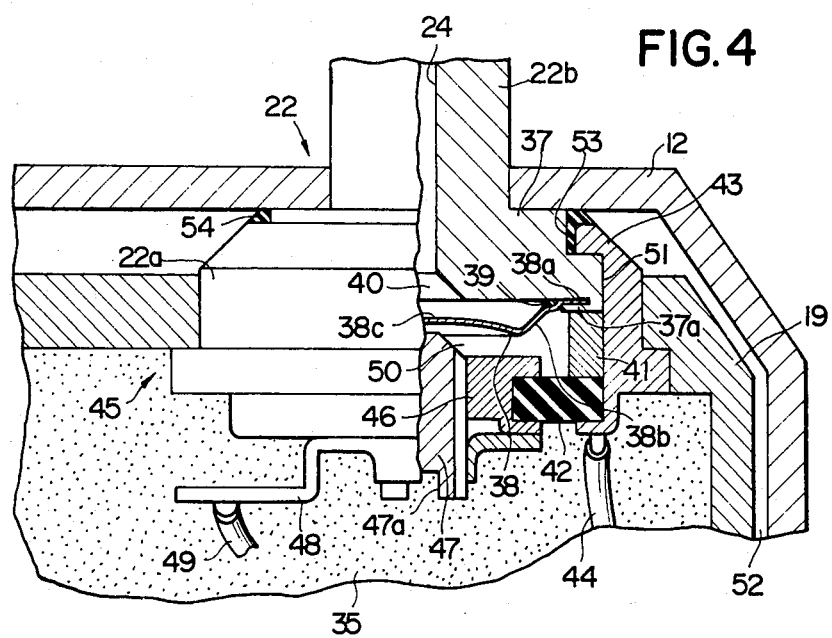
FIG. 4 is a fragmentary sectional view showing, to an enlarged scale, the detailed construction of the pressure-sensitive switch unit forming part of the resonator assembly illustrated in FIGS. 2 and 3.

The axial bore 24 in the tubular connecting member 22b of the switch unit 22 thus arranged is open at one end thereof to the tire chamber 3 and at the other end to a pressure-acting chamber 40 which will become apparent as the description proceeds with reference to FIG. 4. The switch unit 22 is thus responsive to the pressure of the compressed air in the tire chamber 3 through the axial bore 24 in the tubular connecting member 22b and is operative to remain closed when the air pressure in the tire chamber 3 is higher than a predetermined acceptable value and to be open when the air pressure in the tire chamber 3 is lower than the predetermined acceptable value.

The well portion of the wheel rim 2 is formed with annular depressions 27 and 28 which are open to the tire chamber 3 and which encircle the inner axial ends of the openings 16 and 25, respectively, in the wheel rim 2. In these depressions 27 and 28 are closely received suitable sealing elements such as O-rings 29 and 30, respectively, which hermetically seal the openings 16 and 25, respectively, in the well portion of the wheel rim 2 for preventing leakage of compressed air from the tire chamber 3 through the openings 16 and 25. If desired, a retainer plate 31 may be provided between the inner face of the well portion of the wheel rim 2 and the nut 26 and the plain washer 18 for the nut 17 as shown in FIG. 2 for thereby holding the O-rings 29 and 30 in position in the annular depressions 27 and 28, respectively, in the well portion of the wheel rim 2. The retainer plate 31 has opposite end portions turned back for retaining engagement with the nuts 17 and 26 and is thus effective not only to retain the O-rings 29 and 30 in the annular depressions 27 and 28, respectively, in the wheel rim 2 but to prevent the nuts 17 and 26 from turning on the threaded leading end portions of the bolt 15 and the tubular connecting member 22b, respectively. The retainer plate 31 is formed with openings respectively having the tubular connecting member 22b and the bolt 15 axially passed therethrough.

The resonator assembly 5 further comprises a potted resonance circuit structure positioned within the concavity in the inner receptacle 19. The potted resonance circuit structure comprises a resonant inductor constituted by a resonant coil 32 which is wound on a coil-carrying bobbin 33. The coil-carrying bobbin 33 has a continuous outer surface extending in a generally rectangular closed-loop configuration along and throughout the inner surface of the side wall of the inner receptacle 19. The resonant coil 32 is wound in flattened form on this continuous outer surface of the coil-carrying bobbin 33 and is, thus, wound in a generally rectangular closed-loop configuration substantially similar to the configuration of the side wall of the inner receptacle 19 and accordingly to the configuration of the protective outer receptacle 12 when viewed in plan on a plane to be confronted by the oscillator assembly 6 when the tire-and-wheel assembly 4 assumes about the center axis of the wheel rim 2 the previously mentioned predetermined angular position with respect to the backing plate 7, which is held stationary with respect to the vehicle body structure.

The coil-carrying bobbin 33 has a suitable number of lug portions 33a which are spaced apart from each other along the resonant coil 32 and each of which is formed with a groove open toward the inner face of the side wall of the inner receptacle 19. The resonant coil 32 has portions respectively received in the grooves in the individual lug portions 33a and is thereby snugly held in position between the above mentioned continuous outer surface of the coil-carrying bobbin 33 and the inner face of the side wall of the inner receptacle 19. In FIG. 3, the coil-carrying bobbin 33 is shown provided with six such lug portions consisting of two lug portions respectively adjacent the shorter side wall portions of the inner receptacle 19, two lug portions adjacent one of the longer side wall portions of the receptacle 19, and two lug portions adjacent the other longer side wall portion of the receptacle 19.

The above mentioned potted resonance circuit structure further comprises a resonant capacitor 34 having input and outer terminals connected to electrodes mounted on the coil-carrying bobbin 33 and positioned within the concavity in the resonant coil 32. The pressure-sensitive switch unit 22 has terminal elements electrically connected between the resonant coil 32 and the resonant capacitor 34 by means of conductors (not shown) provided within the concavity in the receptacle 19 and constitutes, in combination with the resonant coil 32 and the resonant capacitor 34, an electric resonance circuit which is completed when the switch unit 22 is closed. The resonant coil 32 and the coil-carrying bobbin 33 which are mounted within the inner receptacle 19 and switch unit 22 and the resonant capacitor 34 which are provided inside the coil and bobbin are all encapsulated in a body 35 of a suitable dielectric compound such as an epoxy resin cast in a substantially void-free fashion into the concavity in the inner receptacle 19 as shown in FIG. 2 and are thus integrated as a single unit 36 together with the inner receptacle 19. The unit 36 constitutes the previously mentioned potted resonance circuit structure. The body 35 of the potting compound has a substantially flat outer end face at the initially open end 12a of the protective outer receptacle 12.

As illustrated to an enlarged scale in FIG. 4 of the drawings, the tubular connecting member 22b forming part of the pressure-sensitive switch unit 22 has an annular flange portion 37 closely attached to the inner face of the base wall portion of the protective outer receptacle 12 and having a stepped annular edge adjacent the inner face of the base wall portion of the receptacle 12. The flange portion 37 of the tubular connecting member 22b further has an annular protrusion 37a axially protruding from the end face of the flange portion 37 and formed with a circumferential groove which is open radially inwardly of the flange portion 37. A generally disc-shaped, resilient metallic diaphragm 38 has an annular edge portion 38a closely fitted into the circumferential groove thus formed in the annular protrusion 37a of the flange portion 37. The metallic diaphragm 38 further has an annular banked portion 38b merging radially inwardly out of the annular edge portion 38a and axially slanting away from the end face of the flange portion 37 of the tubular connecting member 22b. The annular banked portion 38b in turn merges radially inwardly into a circular central portion 38c which is biased to be domed toward the end face of the flange portion 37 of the tubular member 22b by its own elasticity. The annular banked portion 38b of the metallic diaphragm 38 thus configured as a whole is soldered or brazed along the entire circumference of the edge portion 38a to the end face of the flange portion 37 of the tubular connecting member 22b as indicated at 39 in FIG. 4 so that the diaphragm 38 is securely attached to the flange portion 37 of the connecting member 22b. The circular central portion 38c of the metallic diaphragm 38 is axially spaced apart from the end face of the flange portion 37 of the tubular connecting member 22b so that a variable-volume pressure-acting chamber 40 is formed between the inner face of the central portion 38c of the diaphragm 38 and the axial bore 24 in the connecting member 22b and thus chamber 40 constantly communicates with the tire chamber 3 of the tire-and-wheel assembly 4 (FIG. 1) through the axial bore 24 in the tubular member 22b. The central portion 38c of the metallic diaphragm 38 is, thus, constantly subjected to the pressure of the compressed air in the tire chamber 3 of the tire-and-wheel assembly 4 through the axial bore 24 in the tubular connecting member 22b and the pressure-acting chamber 40 between the diaphragm 38 and the flange portion 37 of the connecting member 22b. Portion 38c accordingly is forced to deform axially away from the end face of the flange portion 37 against its elasticity by the air pressure thus acting on the diaphragm 38. The diaphragm 38 is designed to be deformed away from the end face of the flange portion when the air pressure developed in the pressure-acting chamber 40 is higher than a predetermined value and to remain in an axial position close to the end face of the flange portion 37 when the air pressure in the chamber 40 is lower than the predetermined value.

The soldering or brazing 39 applied between the annular banked portion 38b of the metallic diaphragm 38 and the end face of the flange portion 37 of the tubular connecting member 22b serves not only for securing the diaphragm 38 to the flange portion 37 of the connecting member 22b but as a sealing means for hermetically isolating the pressure-acting chamber 40 from the groove in the annular protrusion 37a of the flange portion 37 and accordingly precluding leakage of the compressed air from the tire chamber 3 through the opening in the protrusion 37a of the flange portion 37.

The annular protrusion 37a of the flange portion 37 of the tubular connecting member 22b is axially contacted by a ring-shaped spacer element 41 which axially intervenes between the annular protrusion 37a of the flange portion 37 and a ring-shaped support member 42 which is constructed of a rigid, electrically non-conductive material such as a rigid synthetic resin. The flange portion 37 of the tubular connecting member 22b, the spacer element 41 and the support member 42 are held together by a generally cylindrical, hollow metal casing 43 having an axially inner flange portion circumferentially engaging the stepped annular edge of the flange portion 37 and an axially outer flange portion circumferentially engaging the support member 42. The support member 42 thus fitted to the metal casing 43 annularly extends radially inwardly of the casing 43 substantially in coaxial relationship to the casing 43 as will be seen from FIG. 4. An insulated wire 44 is anchored at one end thereof to the axially outer flange portion of the metal casing 43. The insulated wire 44 extends through the body 35 of the potting compound and is connected at its leading end to the resonant coil 32 on the coil-carrying bobbin 33 (FIG. 2). The spacer element 41, the support member 42 and the metal casing 43 constitute, in combination, a casing structure 45 which is shown as the casing structure 22a in FIG. 2.

The ring-shaped support member 42 has its outer peripheral surface closely contacted by the inner peripheral surface of the casing 43 and has an inner peripheral end portion closely received in an outer circumferential groove in an internally threaded annular member 46. The internally threaded annular member 46 annularly extends radially inwardly of the support member 42 and is arranged in such a manner as to have the metallic diaphragm 38 positioned between the annular member 46 and the end face of the flange portion 37 of the tubular connecting member 22b and to have a center axis substantially aligned with the center axis of the circular central portion 38c of the diaphragm 38. An axially elongated, externally threaded, stationary contact element 47 is adjustably screwed to the internally threaded annular member 46 and has an inner axial end portion which axially projects toward the central portion 38c of the metallic diaphragm 38 so that the central portion 38c of the diaphragm 38 is positioned in front of the inner axial end portion of the contact element 47. The contact element 47 is constructed of metal and is thus electrically connected to the metallic diaphragm 38 when the central portion 38c of the diaphragm 38 is deformed axially away from the end face of the flange portion 37 of the tubular connecting member 22b and engages the inner end face of the contact element 47. The contact element 47 has formed in its outer axial end portion a groove 47a adapted to receive therein a tip portion of a screw driver (not shown). The axial position of the contact element 47 with respect to the diaphragm 38 can thus be manually adjusted by turning the contact element 47 in either direction about the center axis of the internally threaded annular member 46 by the use of a screw driver. To the axially outer end face of the annular member 46 is closely attached a terminal element 48 having a hollow cylindrical portion held in contact with the contact element 47. An insulated wire 49 is anchored at one end to the terminal element 48 and is thus electrically connected to the contact element through the terminal element 48. The insulated wire 49 extends through the body 35 of the potting compound and is connected at the other end thereof to one terminal of the resonant capacitor 34 forming part of the previously mentioned potted resonance circuit structure 36. The other terminal of the resonant capacitor 34 is connected to the resonant coil 32 by means of an electric conductor (not shown). When the metallic diaphragm 38 is held in contact with the inner end face of the contact element 47 by the pressure of the compressed air in the pressure-acting chamber 40 communicating with the tire chamber 3, a closed electric circuit is completed through the resonant coil 32, the wire 44, the metal casing 43, the flange portion 37 of the tubular connecting member 22b, the metallic diaphragm 38, the contact element 47, the terminal element 48, the wire 49, the resonant capacitor 34 and the conductor (not shown) interconnecting the resonant coil and capacitor 32 and 34, respectively. The terminal element 48 and the insulated wires 44 and 49 are, together with the coil-carrying bobbin 33, the resonant capacitor 34 and a portion of the casing structure 45 of the switch unit 22, embedded in the body 35 of the potting compound. The casing structure 45 of the pressure-sensitive switch unit 22 thus constructed and arranged has a variable-volume atmospheric chamber 50 which is hermetically isolated by the metallic diaphragm 38 from the pressure-acting chamber 40 formed in the flange portion 37 of the tubular connecting member 22b of the switch unit 22. The atmospheric chamber 50 is defined by the diaphragm 38, spacer element 41, support member 42, internally threaded annular member 46 and externally threaded contact element 47 and is in constant communication with the open air through slight interstices or leaks 51 formed between the surfaces over which the flange portion 37 of the tubular connecting member 22b are in fitting contact with the spacer element 41 and the metal casing 43 and further through a gap 52 formed between the inner faces of the protective outer receptacle 12 and the outer faces of the inner receptacle 19. In the atmospheric chamber 50 of the pressure-sensitive switch unit 22 is thus constantly developed an atmospheric pressure which is introduced into the chamber 50 through the gap 52 and the leaks or interstices 51.

The axially inner flange portion of the metal casing 43 projects radially inwardly from the casing 43 and is radially outwardly spaced apart from the outer peripheral surface of the stepped annular edge of the flange portion 37 of the tubular connecting member 22b. An annular gap 53 is thus formed between the inner peripheral surface of the axially inner flange portion of the metal casing 43 and the outer peripheral surface of the stepped annular edge of the flange portion 37, the gap 53 intervening between the leaks or interstices 51 in the switch unit 22 and the gap 52 between the outer and inner receptacles 12 and 19. A suitable gas-permeable synthetic rubber which is impervious to water and solid particles such as dust is applied in the form of an annular layer 54 into the annular gap 53 throughout the circumference of the gap 53 so as to prevent entry of water and dust into the pressure-sensitive switch unit 22 while allowing atmospheric air into the atmospheric chamber 50 through the gaps 52 and 53 and the leaks or interstices 51.

Description will be hereinafter made with reference to FIGS. 1 to 4 of the drawings regarding the operation of the tire pressure drop detecting apparatus thus constructed and arranged.

When the vehicle is being driven with the road wheels are rotating on a road surface, the tire-and-wheel assembly 4 is driven to rotate about the center axis of the wheel rim 2 with respect to the backing plate 7 which is held stationary with respect to the body structure of the vehicle. As the tire-and-wheel assembly 4 is thus rotated about the center axis of the wheel rim 2, the resonator assembly 5 mounted on the well portion of the wheel rim 2 is also rotated about the center axis of the wheel rim 2 with respect to the backing plate 7 and is thus brought into face-to-face relationship to the oscillator assembly 6 supported by the backing plate 7 each time the tire-and-wheel assembly 4 makes a full turn with respect to the vehicle body structure. If, in this instance, the pressure of the compressed air in the tire chamber 3 of the tire-and-wheel assembly 4 is higher than a predetermined acceptable value, the central portion 38c of the metallic diaphragm 38 of the pressure-sensitive switch unit 22 is forced against the inner end face of the stationary contact element 47 of the switch unit 22 by the air pressure developed in the pressure-acting chamber 40 of the switch unit 22 through the axial bore 24 in the tubular connecting member 22b of the switch unit 22. A closed electric circuit is thus formed through the resonant coil 32, insulated wire 44, metal casing 43, flange portion 37, metallic diaphragm 38, contact element 47, terminal element 48, insulated wire 49, resonant capacitor 34 and the conductor interconnecting the resonant coil and capacitor 32 and 34. It therefore follows that an electric current is induced in the resonant coil 32 of the resonator assembly 5 by the resonant coupling between the resonator and oscillator assemblies 5 and 6 each time the resonator assembly 5 is brought into face-to-face relationship to the oscillator assembly 6. The induction of the electric current in the resonant coil 32 causes a normal decrement in the energy of the electromagnetic wave radiant from the oscillator assembly 6. The decrement in the electromagnetic wave energy is converted into a corresponding signal delivered from the oscillator assembly 6 to the signal processing unit 10 through the coaxial cable 9. In response to the signal thus delivered from the oscillator assembly 6, the signal processing unit 10 supplies to the display or warning device 11 a signal effective to hold the display or warning device 11 inoperative, enabling the vehicle driver to confirm that the air pressure in the tire chamber 3 of the tire-and-wheel assembly 4 is higher than the predetermined acceptable value.

In the event the pressure of air in the tire chamber 3 happens to drop below the predetermined acceptable value due, for example, to the occurrence of a puncture in the tire 1, the air pressure developed in the pressure-acting chamber 40 of the pressure-sensitive switch unit 22 is also reduced and allows the central portion 38c of the metallic diaphragm 38 to warp away from the inner end face of the contact element 47 of the switch unit 22, thereby interrupting the electrical connection between the diaphragm 38 and the contact element 47. The pressure-sensitive switch unit 22 being thus made open, the resonant coil 32 and the resonant capacitor 34 are disconnected from each other across the switch unit 22 so that the resonant circuit constituted by the switch unit 22 and the resonant coil and capacitor 32 and 34 is made inoperative. In the absence of an electric current in the resonator assembly 5, the resonant coupling bewteen the resonator and oscillator assemblies 5 and 6 is destroyed and, as a consequence, there is no normal decrement in the energy of the electromagnetic wave radiant from the oscillator assembly 6. Under these conditions, the display or warning device 11 is actuated to produce a sound or luminant signal indicative of the occurrence of the puncture in the tire 1 in response to a signal supplied from the signal processing unit 10.

Figure 5:
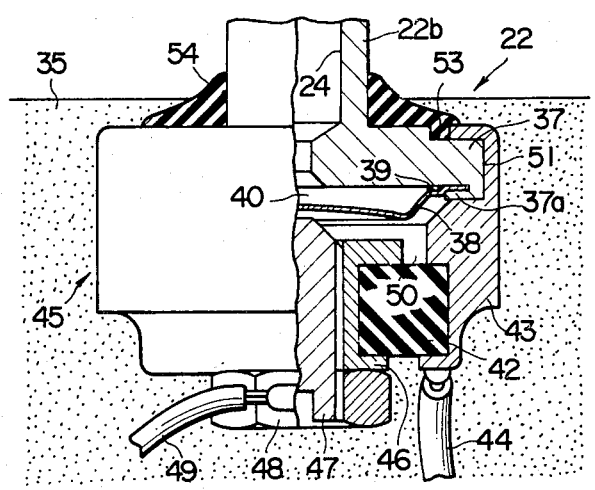
FIG. 5 is a view similar to FIG. 4 but shows part of a resonator assembly including another preferred embodiment of the pressure-sensitive switch unit according to the present invention.

FIG. 5 illustrates another preferred embodiment of the resonator assembly according to the present invention. The resonator assembly shown in FIG. 5 is devoid of the outer and inner receptacles 12 and 19 of the embodiment shown in FIG. 4 and, thus, the casing structure 45 of the pressure-sensitive switch unit 22 is totally embedded in the body 35 of the potting compound which has outer surfaces totally exposed in the open air surrounding the resonator assembly 5. The cylindrical metal casing 43 is formed with two, axially inner and outer, inner circumferential grooves respectively having fitted therein the stepped annular edge of the flange portion 37 of the tubular connecting member 22b and the electrically non-conductive, ring-shaped support member 42 as shown. Thus, the spacer element 41 included in the embodiment illustrated in FIG. 4 is formed as an integral portion of the metal casing 43 in the embodiment shown in FIG. 5.

In the embodiment of FIG. 5, furthermore, the atmospheric chamber 50 in the pressure-sensitive switch unit 22 is defined by the metallic diaphragm 38, support member 42, metal casing 43, internally threaded annular member 46 and externally threaded contact element 47 and is in constant communication with the open air through the slight leaks or interstices 51 formed between the contact surfaces of the metal casing 43 and the flange portion 37 of the tubular connecting member 22b of the switch unit 22 and further through the annular gap 53 formed between the stepped annular edge of the flange portion 37 and the axially inner flange portion of the metal casing 43. A gas-permeable synthetic rubber impervious to water and solid particles is applied in the form of an annular layer or heap 54 in part into the annular gap 53 throughout the circumference of the gap 53 and in part onto the outer peripheral surface of the stem portion of the tubular connecting member 22b. The layer 54 of the gas-permeable synthetic rubber projects outwardly from the body 35 of the dielectric potting compound and is in part exposed to the open air as will be seen in FIG. 5 so as to preclude an ingress of water and solid particles into the switch unit 22 while allowing atmospheric air to reach the atmospheric chamber 50 in the switch unit 22 through the annular gap 53 and the leaks or interstices 51. In the embodiment illustrated in FIG. 5, furthermore, the terminal element 48 electrically intervening between the contact element 47 and the insulated wire 49 is constituted by a nut engaging the externally threaded axially outer end portion of the contact element 47 projecting from the internally threaded annular member 46.

Figure 6:
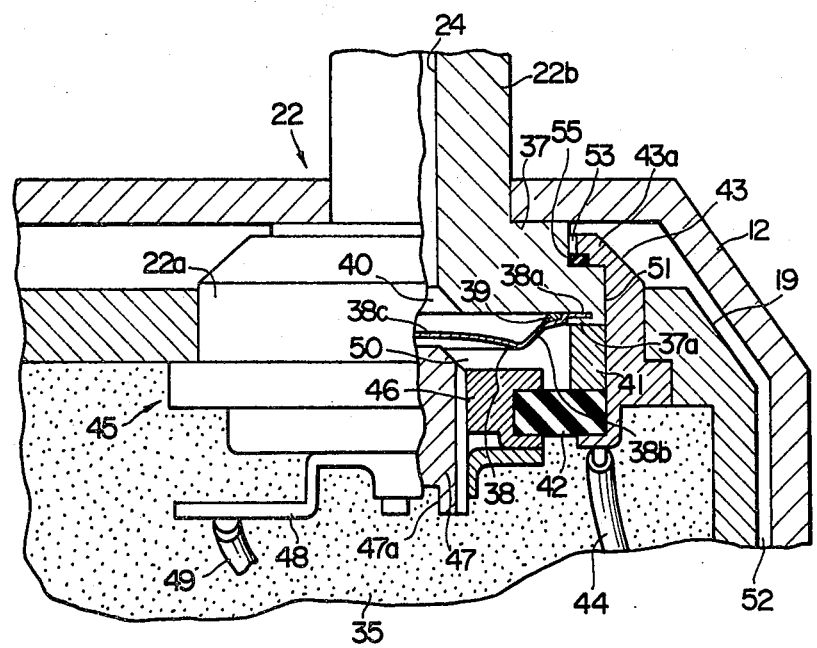
FIG. 6 is a view also similar to FIG. 4 but shows part of a resonator assembly including still another preferred embodiment of the present invention.

Turning to FIG. 6 of the drawings, there is shown still another preferred embodiment of the resonator assembly according to the present invention. The embodiment shown in FIG. 6 is a modification of the embodiment illustrated in FIG. 4 and differs from the embodiment of FIG. 4 only in respect of the arrangement in which the gas-permeable synthetic rubber applied into the annular gap 53 between the metal casing 43 and the flange portion 37 of the tubular connecting member 22b in the embodiment of FIG. 4 is replaced with an annular sealing element 55 provided between the flange portion 37 and the metal casing 43. The annular sealing element 55 is formed of a gas-permeable synthetic rubber impervious to water and solid particles and closely received between the outer peripheral surface of the stepped annular edge of the flange portion 37 and an inner circumferential groove formed in the axially inner flange portion 43a of the metal casing 43. The atmospheric chamber 50 formed in the pressure-sensitive switch unit 22 is, thus, in constant communication with the gap 52 between the outer and inner receptacles 12 and 19 through the leaks or interstices between the contact surfaces of the flange portion 37 and the spacer element 41, the contact surfaces of the flange portion 37 and the metal casing 43 and further through the annular gap 53 between the flange portion 37 and the axially inner flange portion 43a of the metal casing 43. In comparison with the embodiments of FIGS. 4 and 5, the embodiment illustrated in FIG. 6 is advantageous in that the sealing element 55 in the arrangement of FIG. 6 can be applied between the flange portion 37 and the metal casing 43 more uniformly throughout the circumferential extent of the annular gap 53 than the annular layer 54 of the gas-permeable synthetic rubber applied into the annular gap 53 in each of the arrangements illustrated in FIGS. 4 and 5 and is accordingly capable of precluding an ingress of water and solid particles into the switch unit 22 more reliably than the latter. While, furthermore, there is a concern that an excess of gas-permeable synthetic rubber should be applied into the annular gap 53 in each of the arrangements illustrated in FIGS. 4 and 5, such a concern is not encountered in the arrangement of FIG. 6 so that deterioration of the external appearance of the pressure-sensitive switch unit 22 and the difficulties in assembling the switch unit 22 as would otherwise result from excessive application of the gas-permeable synthetic rubber can be avoided. In the arrangement of FIG. 6, the inner circumferential groove formed in the axially inner flange portion 43a of the metal casing 43 may be replaced with or provided in combination with an outer circumferential groove (not shown) formed in the flange portion 37 of the tubular connecting member 22b.

A tire pressure drop detecting apparatus incorporating each of the embodiments illustrated in FIGS. 5 and 6 operates similarly to the apparatus illustrated in FIGS. 1 to 4 as will be readily understood and, for this reason, a description has not been herein made regarding the operation of the pressure drop detecting apparatus using the resonator assembly of the type illustrated in FIG. 5 or 6.

From the foregoing description it will have been appreciated that the most outstanding feature of the resonator assembly proposed by the present invention is the construction of the pressure-sensitive switch unit 22 in which the atmospheric chamber 50 formed therein is allowed to communicate with the atmosphere through the slight leaks or interstices formed between the contact surfaces of the two or three component parts of the switch unit and is nevertheless protected from an ingress of water and solid particles by the provision of the layer, or sealing element, of a gas-permeable, water-impervious synthetic rubber at the end of the leaks or interstices open to the atmosphere. An atmospheric pressure is thus at all times established in the atmospheric chamber of the switch unit so that the switch unit is enabled to be open or closed accurately, durably and reliably in response to a predetermined tire pressure without respect to various weather and operational conditions to which the resonator assembly will be subjected during use thereof.

What is claimed is:

1. A pressure-sensitive switch unit to form part of a resonator assembly for use in an apparatus for detecting a pressure drop in a tire chamber of a tire-and-wheel assembly which consists essentially of a wheel rim and a pneumatic tire fitted to the wheel rim and which has said tire chamber formed between the tire and the wheel rim, comprising:

an outer receptacle, an inner receptacle fixedly positioned within the outer receptacle with a gap formed between the inner faces of said outer receptacle and the outer surfaces of the inner receptacle and open to the atmosphere, a casing structure received in said outer and inner receptacles, the casing structure being at least in part encapsulated in a body of a dielectric potting compound received in said inner receptacle, a connecting member fixedly connecting said outer and inner receptacle to said wheel rim of said tire-and-wheel assembly, the connecting member fitted to said casing structure and formed with a passageway for communicating with the tire chamber in said tire-and-wheel assembly, a resilient diaphragm positioned between the casing structure and the connecting member and forming a variable-volume pressure-acting chamber between the diaphragm and the connecting member and a variable-volume atmospheric chamber between the diaphragm and the casing structure, the pressure-acting chamber being open to said passageway, the casing structure having an axially elongated contact element having an end portion axially projecting into said atmospheric chamber toward said diaphragm, the end portion of said contact element and said diaphragm being engageable with each other for providing electrical connection therebetween, the casing structure and said connecting member respectively having inner and outer surface portions which are held in contact with each other and which have formed therebetween an interstice which is open at one end to said gap between said outer and inner receptacles and which communicates at the other end with said atmospheric chamber, and a body of gas-permeable synthetic rubber which is applied to said surface portions adjacent said one end of said interstice and which is in part exposed to the atmosphere through said gap between said outer and inner receptacle for providing air communication between the atmosphere and said interstice through said body of the gas-permeable synthetic rubber.

2. A pressure-sensitive switch unit as set forth in claim 1, in which said casing structure and said connecting member respectively have peripheral surface portions which are radially spaced apart from each other and which have an annular gap formed therebetween, said gas-permeable synthetic rubber being applied in the form of an annular layer in said gap throughout the circumference of the gap.

3. A pressure-sensitive switch unit as set forth in claim 2, in which said casing structure has a portion projecting outwardly from said body of the dielectric potting compound and in which said connecting member is fitted to said portion of the casing structure.

4. A pressure-sensitive switch unit as set forth in claim 2, in which said casing structure is embedded in its entirety in said body of the dielectric potting compound and in which said connecting member has a portion embedded in the body of the dielectric potting compound, said portion of the connecting member having a surface adjacent said peripheral surface portions of the casing structure and the connecting member, said gas-permeable synthetic rubber being further applied in the form of a layer onto said surface of said portion of the connecting member and being partially exposed to the atmospheric air.

5. A pressure-sensitive switch unit as set forth in claim 1, in which said casing structure and said connecting member respectively have peripheral surface portions which are radially spaced apart from each other and which have an annular gap formed therebetween, said body of the gas-permeable synthetic rubber being constituted by an annular sealing element of the synthetic rubber and being closely fitted in said gap.

6. A pressure-sensitive switch unit as set forth in claim 5, said casing structure having a portion projecting outwardly from said body of the dielectric potting compound and in which said connecting member is fitted to said portion of the casing structure.

7. A pressure-sensitive switch unit as set forth in claim 6, in which at least one of said casing structure and said connecting member is formed with a circumferential groove which is radially open to said annular gap, said sealing element of the gas-permeable synthetic rubber being received in part in said gap and in part in said groove.

8. A pressure-sensitive switch unit as set forth in claim 1, in which said casing structure comprises a generally cylindrical hollow casing having said connecting member fitted thereto and formed with one of said surface portions, an annular support member fitted to said casing and annularly extending radially inwardly of the casing, an annular member fitted to said support member and annularly extending radially inwardly of the support member, the annular member being arranged to have said diaphragm positioned intermediate between the annular member and said connecting member and to thereby form said atmospheric chamber between the diaphragm and the annular member, and an axially elongated contact element engaging said support member through the opening in the annular member and having an end portion axially projecting into said atmospheric chamber toward said diaphragm so that the diaphragm is engageable with said end portion of the contact element when deformed toward the end portion, the diaphragm and the contact element being constructed of a rigid, electrically conductive material and being electrically connected together when the diaphragm is deformed into engagement with said end portion of the contact element.

9. A pressure-sensitive switch unit as set forth in claim 8, in which said connecting member has a portion received in said casing and formed with the other of said surface portions.

10. A pressure-sensitive switch unit as set forth in claim 9, in which said diaphragm is secured along its peripheral end to said portion of the connecting member.

11. A pressure-sensitive switch unit as set forth in claim 10, in which each of said casing and said portion of said connecting member is constructed of a rigid, electrically conductive material and said support member is constructed of an electrically non-conductive material so that said casing is electrically connected to said contact element through said portion of the connecting member and said diaphragm when the diaphragm is deformed into engagement with said end portion of the contact element.

12. A pressure-sensitive switch unit as set forth in claim 8, in which said annular member is internally threaded and said contact element is externally threaded and is adjustably engaged by the annular member.

13. A pressure-sensitive switch unit as set forth in claim 8, in which said diaphragm has an annular edge portion secured to said connecting member and a substantially circular central portion positioned in front of said end portion of said contact element.

14. A pressure-sensitive switch unit as set forth in claim 13, in which said diaphragm is soldered to said connecting member along the entire circumference of said annular edge portion of said diaphragm so that said pressure-acting chamber and said atmospheric chamber are hermetically isolated from each other.

15. A pressure-sensitive switch unit as set forth in claim 13, in which said diaphragm further has an annular bank portion radially inwardly merging out of said annular portion into said central portion of the diaphragm and axially slanting away from said connecting member, said central portion of the diaphragm being biased to be domed away from said end portion of said contact element.

16. A pressure-sensitive switch unit as set forth in claim 15, in which said bank portion is soldered to said connecting member throughout the circumference of the bank portion.

17. A pressure-sensitive switch unit as set forth in claim 13, in which said connecting member has a flange portion received in said casing and having an annular end face defining part of said pressure-acting chamber, said flange portion being formed with the other of said surface portions.

18. A pressure-sensitive switch unit as set forth in claim 17, in which said flange portion of said connecting member is further formed with an inner circumferential groove having said annular edge portion of said diaphragm closely fitted therein throughout the circumference of the edge portion.

* * * * *